(12) United States Patent
Newman et al.

(10) Patent No.: US 12,410,881 B2
(45) Date of Patent: Sep. 9, 2025

(54) NON-INTRUSIVE TRACKING OF OBJECTS IN PIPELINES AND WELLBORES

(71) Applicant: Halliburton Energy Services, Inc., Houston, TX (US)

(72) Inventors: Stephen Christopher Newman, Aberdeen (GB); Graham Peter Jack, Newburgh (GB)

(73) Assignee: Halliburton Energy Services, Inc., Houston, TX (US)

( * ) Notice: Subject to any disclaimer, the term of this patent is extended or adjusted under 35 U.S.C. 154(b) by 3 days.

(21) Appl. No.: 17/916,463

(22) PCT Filed: Dec. 18, 2020

(86) PCT No.: PCT/US2020/065902
§ 371 (c)(1),
(2) Date: Sep. 30, 2022

(87) PCT Pub. No.: WO2022/060391
PCT Pub. Date: Mar. 24, 2022

(65) Prior Publication Data
US 2023/0220944 A1    Jul. 13, 2023

Related U.S. Application Data

(60) Provisional application No. 63/080,431, filed on Sep. 18, 2020.

(51) Int. Cl.
*F16L 55/48*    (2006.01)
*E21B 43/12*    (2006.01)
(Continued)

(52) U.S. Cl.
CPC ............ *F16L 55/48* (2013.01); *E21B 47/047* (2020.05); *E21B 47/095* (2020.05); *F16L 55/38* (2013.01);
(Continued)

(58) Field of Classification Search
CPC ...... E21B 47/047; E21B 47/09; E21B 47/095; F16L 55/48
See application file for complete search history.

(56) References Cited

U.S. PATENT DOCUMENTS

| 4,590,799 A | 5/1986 | Brown et al. |
| 5,417,112 A | 5/1995 | Rosenberg |

(Continued)

FOREIGN PATENT DOCUMENTS

| CN | 1062946 | 3/2001 |
| CN | 108374654 B | 12/2023 |

(Continued)

OTHER PUBLICATIONS

Brazilian Office Action for BR Patent Application No. 112022025087-8 dated Apr. 19, 2024 with Search Report and Opinion dated Nov. 14, 2023. English Machine Translation with Original Untranslated Version, PDF file. 11 pages.

(Continued)

*Primary Examiner* — Kristyn A Hall
(74) *Attorney, Agent, or Firm* — Thomas Rooney; C. Tumey Law Group PLLC

(57) ABSTRACT

Systems and methods of the present disclosure relate to non-intrusive tracking of objects in a conduit from a single location. A system comprises a component positioned to control flow into or out of the conduit to induce pressure waves in the conduit; a pressure transducer in fluid communication with the conduit, the pressure transducer positioned to measure pressure responses in the conduit due to contact of the pressure waves with the object; and a system controller operable to: receive pressure data from the pressure transducer, wherein the pressure data includes the pressure responses to the pressure waves; and determine a distance of the object in the conduit, relative to the compo- (Continued)

nent or the pressure transducer, based on the pressure responses.

19 Claims, 5 Drawing Sheets

(51) Int. Cl.
*E21B 47/047* (2012.01)
*E21B 47/095* (2012.01)
*F16L 55/38* (2006.01)
*F16L 101/12* (2006.01)
*F16L 101/30* (2006.01)
*G01F 23/2962* (2022.01)
*G01S 15/08* (2006.01)
*G01V 1/46* (2006.01)

(52) U.S. Cl.
CPC .......... *G01F 23/2962* (2013.01); *G01S 15/08* (2013.01); *G01V 1/46* (2013.01); *E21B 43/126* (2013.01); *F16L 2101/12* (2013.01); *F16L 2101/30* (2013.01)

(56) References Cited

U.S. PATENT DOCUMENTS

| | | | |
|---|---|---|---|
| 5,549,000 | A | 8/1996 | Brown et al. |
| 6,401,814 | B1 | 6/2002 | Owens et al. |
| 6,710,720 | B2 | 3/2004 | Carstensen et al. |
| 6,993,963 | B1 | 2/2006 | Gudmundsson |
| 7,222,549 | B2 | 5/2007 | Abney |
| 8,973,444 | B2 | 3/2015 | Hill et al. |
| 9,535,039 | B2 | 1/2017 | Farquéet al. |
| 9,599,272 | B2 | 3/2017 | Hartog et al. |
| 9,828,847 | B2 | 11/2017 | Vavik |
| 2014/0182846 | A1 | 7/2014 | Fischer et al. |
| 2014/0262245 | A1* | 9/2014 | Hill .................. E21B 47/047 166/250.03 |
| 2015/0323119 | A1 | 11/2015 | Giunta et al. |
| 2015/0331007 | A1 | 11/2015 | Giunta et al. |
| 2017/0234713 | A1 | 8/2017 | McCoy |
| 2017/0268714 | A1 | 9/2017 | Giron et al. |
| 2017/0307462 | A1* | 10/2017 | Barron ................ E21B 41/0007 |
| 2019/0129047 | A1* | 5/2019 | Clark .................... E21B 47/095 |
| 2020/0072042 | A1 | 3/2020 | Kim et al. |

FOREIGN PATENT DOCUMENTS

| | | | | |
|---|---|---|---|---|
| GB | 2462096 | A * | 1/2010 | ............. F16L 55/48 |
| GB | 2506838 | | 7/2017 | |
| JP | H0586792 | A | 4/1993 | |
| JP | H06129942 | | 5/1994 | |
| KR | 20170038574 | | 4/2017 | |
| KR | 20170050045 | | 5/2017 | |
| WO | WO-9950586 | A1 * | 10/1999 | ............. F16L 55/46 |
| WO | 2006054054 | | 5/2006 | |
| WO | 2011070343 | | 6/2011 | |
| WO | WO-2020162964 | A1 * | 8/2020 | ............. F16L 55/46 |

OTHER PUBLICATIONS

European Patent Office Extended European Search Report for EPO Application No. 20954313.1 dated Mar. 4, 2024. PDF file. 8 pages.
Technical Research Centre of Finland, Timo Siikonen, Computer Program TMOC for Calculating of Pressure Transients in Fluid Filled Piping Networks.
Durali, Mohammad; Fazeli, Amir; Nabi, Ali (2007). [ASME ASME 2007 International Mechanical Engineering Congress and Exposition—Seattle, Washington, USA (Nov. 11-15, 2007)] vol. 9: Mechanical Systems and Control, Parts A, B, and C—Investigation of Dynamics and Vibration of Pig in Oil and Gas Pipelines. , (), 2015-2024.
Sensors, Renan Pires de Araujo, et al., Pipeline Inspection Gauge's Velocity Simulation Based on Pressure Differential Using Artificial Neural Networks, 2018.
Downhole Diagnostic, Acoustic Fluid Level Surveys. Available at https://www.downholediagnostic.com/fluid-level. Accessed Dec. 14, 2020.
Circor, Pipeline Blockage Detection—ACOUSTEK®. Available at https://www.circor.com/services/pipeline-blockage-detection-acoustek. Accessed Dec. 14, 2020.
Paradigm Flow Services, Locate Blockages of Was, Asphaltene, Sand, Scale, Hydrates and Stuck Pigs. Available at https://www.paradigm.eu/flow/technology/find-block. Accessed Dec. 14, 2020.
PPS—InnerVue, Available at https://www.ppsa-online.com/directory-of-members?company_id=191. Accessed Dec. 14, 2020.
International Search Report and Written Opinion for Application No. PCT/US2020/065902, dated Jun. 8, 2021.
Schlumberger Energy Glossary. Definition of well bore. Company Website, https://glossary.slb.com/en/terms/w/wellbore. Accessed Jun. 26, 2024.
Schlumberger Energy Glossary. Definition of pipline. Company Website, https://glossary.slb.com/en/terms/p/pipeline. Accessed Jun. 26, 2024.
Schlumberger Energy Glossary. Definition of casing Company Website, https://glossary.slb.com/en/terms/c/casing. Accessed Jun. 28, 2024.
Schlumberger Energy Glossary. Definition of pigging Company Website, https://glossary.slb.com/en/terms/p/pigging. Accessed Jun. 26, 2024.

* cited by examiner

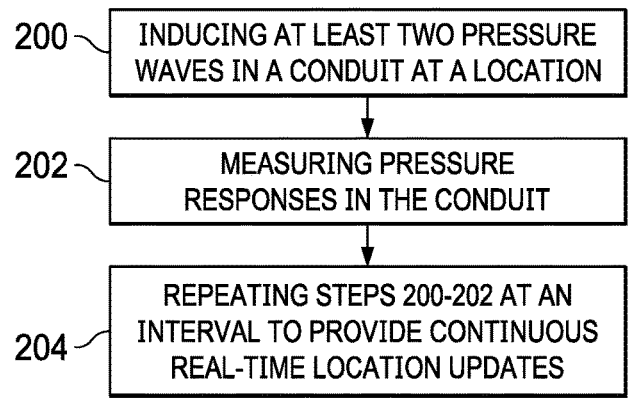
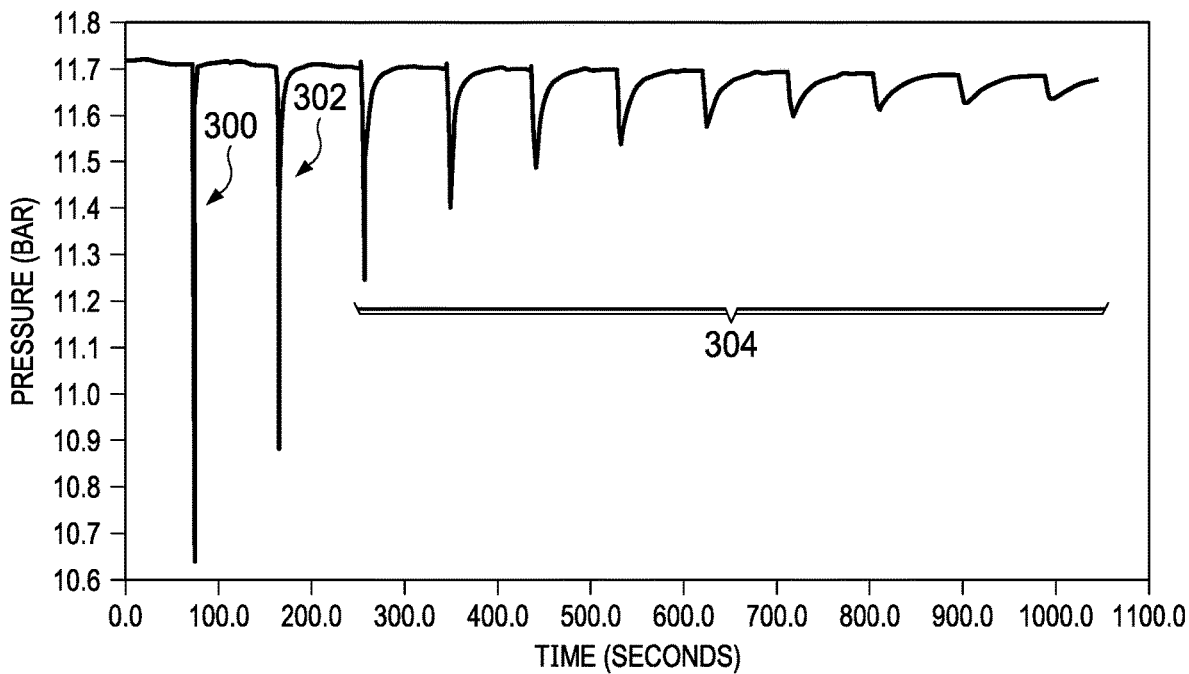

NON-INTRUSIVE TRACKING OF OBJECTS IN PIPELINES AND WELLBORES

BACKGROUND

Pipelines may experience a range of issues such as a build-up of deposits or full blockages and stuck pigs due to these build ups. The pigs may be propelled through the pipeline via flowing fluid and may serve various functions, including cleaning the pipeline to remove obstructions, inspecting the interior of the pipeline, and/or providing a barrier to separate different fluids in the pipeline.

If the location of a pig is not known and the pig gets stuck in the pipeline for example, downtime required to displace the pig from the pipeline can be costly. Additionally, if a velocity of the pig cannot be tracked, pig overspeed may occur. Existing technologies may require numerous pieces of equipment on the pig as well as outside and inside of the pipeline for estimating the pig's location such as pig signalers at set locations.

BRIEF DESCRIPTION OF THE DRAWINGS

These drawings illustrate certain aspects of some examples of the present disclosure and should not be used to limit or define the disclosure.

FIG. 2 illustrates a flow chart for locating and tracking of moving or stationary objects within pipelines and/or wellbores, in accordance with examples of the present disclosure;

FIG. 3 illustrates a pressure response during object tracking, in accordance with examples of the present disclosure;

DETAILED DESCRIPTION

The present disclosure generally relates to systems and methods for monitoring objects within conduits such as pipelines or wellbores, for example. The objects may be moving or stationary. The systems and methods of the present disclosure may allow for non-intrusive location tracking of pipeline pigs or hydrates, among other objects. In some examples, the hydrates may be tracked during hydrate remediation operations.

The tracking of an object in a conduit may occur in real-time via an analysis of an induced pressure wave and its corresponding response that may travel along the conduit back to the origin or source of the pressure wave inducement. The tracking may be performed by creating or inducing a pressure wave in the conduit and analyzing a pressure response to determine a real-time location, such as a depth or a distance of the object within the conduit, relative to a position of the source of the pressure wave inducement.

In some examples, at least two pressure waves may be induced to elicit or cause at least two corresponding pressure responses that may reflect off of a desired target or object, and travel as pressure responses back to the source of the pressure wave inducement for analysis by a system controller. An interaction due to contact between the induced pressure waves and the desired target may result in the pressure responses. The analysis may be automated and repeated to track the objects, and locations of the objects may be indicated on a map that may be accessible via a web portal, for example.

The systems and methods may provide for increased accuracy and distance capability over other acoustic methods. For example, numerous sensors positioned along a pipeline to track the pig, such as microphones or externally mounted pig-tracking devices are not required. Rather, flow rates and pressure losses in the conduit may be measured at or near a pig launching station ("pig launcher") or a pig receiving station ("pig receiver"), using two or more pressure waves.

Further, tracking of objects along an entire length of a conduit may occur, rather than only progress or movement past set locations. The real-time tracking may allow for an accurate assessment of time duration for operating a pig in the pipeline ("pigging").

In some examples, a system controller and a pressure measurement device may be operatively coupled to existing infrastructure such as at an end of a pipeline that may include the pig receiver or the pig launcher. A device for inducing the pressure waves by controlling flow of a fluid, may be a component of the existing infrastructure, such as a valve, a pump, and/or a supply vessel, for example. Each of the components may be positioned to control a flow of fluid within a conduit to induce pressure waves.

Figure 1A:
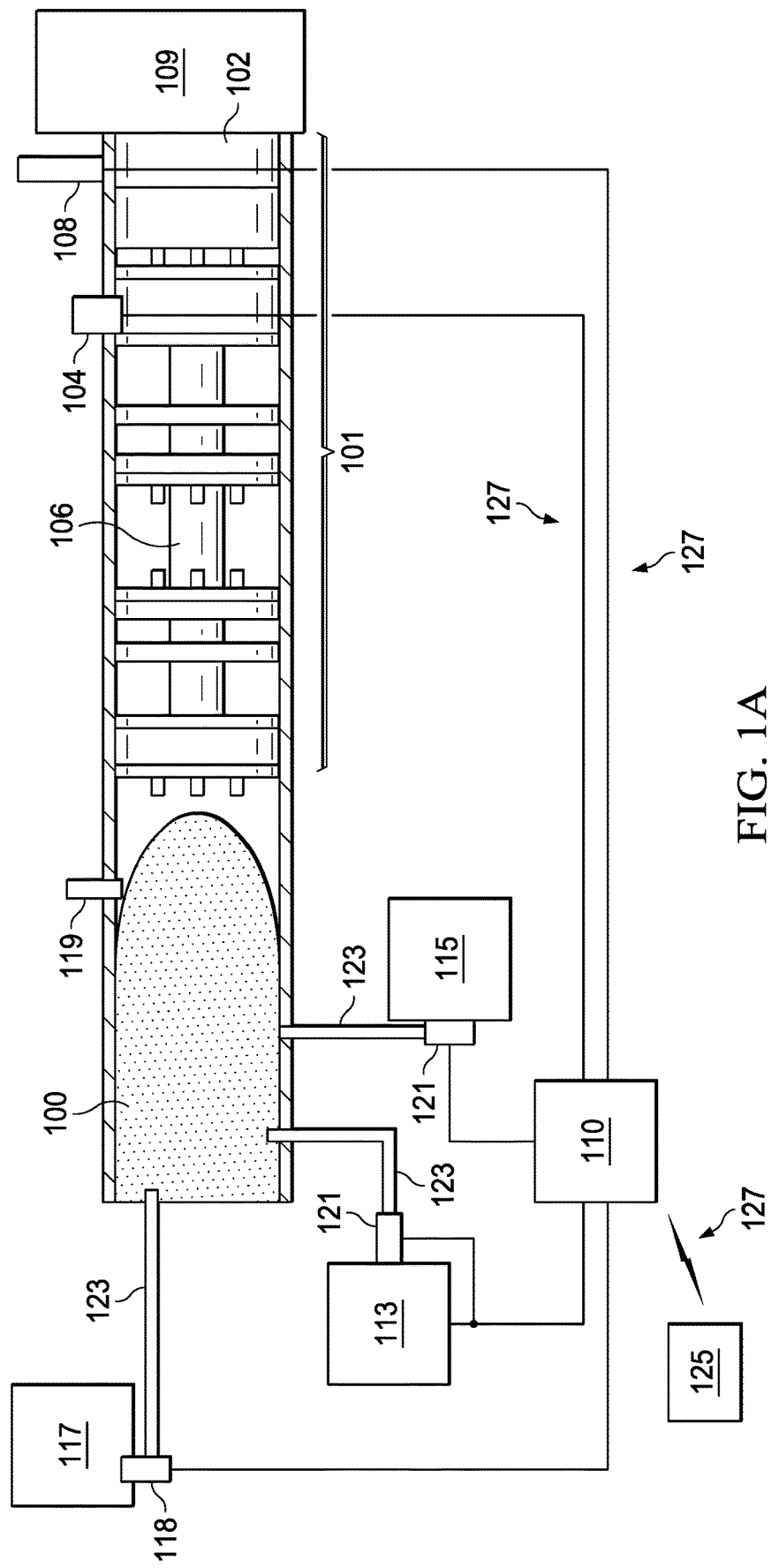
FIG. 1A illustrates a pipeline with an object disposed downstream to a pressure transducer, in accordance with examples of the present disclosure.

FIG. 1A illustrates a conduit 100 with an object 101 disposed upstream of a pressure transducer 104, in accordance with examples of the present disclosure. The conduit 100 may represent a pipeline or a wellbore, in certain examples. The pressure transducer 104 may be in fluid communication with contents of the conduit 100 to indicate an internal pressure of the conduit 100. The pressure transducer 104 may sample data at a rate of at least 1 kilohertz (kHz), such as 1-4 kHz or higher, for example. In some examples, the pressure transducer 104 may measure pressures up to about 10,000 pounds per square inch (psi) or about 690 bar.

The object 101 may include a variety of debris 102 (e.g., hydrates) that may impede a flow of fluid(s) therethrough. Additionally, the object 101 may include a pipeline pig 106, in some examples. The conduit 100 may also include a passage (e.g., valve 108) to control flow such as an ingress or egress of fluid. Rapid opening and closing of the valve 108 may induce pressure waves within the conduit 100. The valve 108 may open and close within seconds. In some examples, longer durations may also be utilized work, but interpretation of the reflected waves may be more difficult. In some examples, 5 seconds may be the maximum open time. In other examples, the valve 108 may remain open for 1 second or less before it is closed. In some examples, the pressure transducer 104 and the valve 108 may be disposed downstream to the object at an end of the conduit 100 such as at or adjacent to a pig receiver 109. It should be noted that the pressure transducer 104 and the valve 108 may alternatively be disposed upstream to the object such as at or adjacent to a pig launcher (not shown). In particular examples, multiple pressure transducers and valves may be utilized in both upstream and/or downstream directions.

The pressure waves may include positive and/or negative pressure waves which may be induced by manipulation of the valve 108, for example. In certain examples, a negative pressure wave may be induced within the conduit 100. In addition to the valve 108, a number of suitable techniques may be used for inducing the pressure waves. For example, reciprocating pump 113 may remove fluid from the conduit 100 to induce a negative pressure wave. By way of further example, fluid may be released from the conduit 100 into an expansion vessel 115. In some examples, a valve 119 may be used to bleed of fluid from the conduit 100.

In addition to or in combination with the negative pressure, a positive pressure wave may also be induced in the conduit 100. In some examples, the valve 108 may be utilized to induce the positive pressure wave. In additional examples, a supply tank or a supply vessel 117 may supply fluid into the conduit 100 to induce the positive pressure wave in the conduit 100. In some examples, the supply vessel 117 may utilize a pump 118 to move fluid into the conduit 100. The supply vessel 117 may provide any suitable fluids into the conduit 100. Non-limiting examples may include gas such as nitrogen into a gas system, or water (or other suitable liquid) into a liquid system. By way of further example, fluid such as nitrogen may be flowed into the conduit 100 via the supply vessel 117.

The reciprocating pump 113 and the vessels 115 and 117 may be in fluid communication with the conduit 100 via valves 121 and/or conduits 123. It should be noted that mechanisms to induce pressure waves such as those described herein, for example, may be disposed at various locations along the conduit 100. The locations may be upstream and/or downstream to the object 101 or a desired target. The pressure waves may be induced at regular intervals, or the intervals may be variable. In some examples, there may be multiple objects at multiple locations in the conduit 100. In particular examples, sonic waves may be induced at regular or variable intervals and may be utilized in accordance with examples of the present disclosure. In some examples, the inducement of the pressure waves may occur manually. In other examples, the inducement of pressure waves may be automated via a system controller.

In some examples, a system controller 110 may control fluid flow into and out from the conduit 100. For example, the system controller 110 may be operable to control the valve 108, the pumps 113 and 118, and/or the valves 121 to induce the pressure waves that may travel through the conduit 100 eliciting a pressure response. The pressure response includes a reflected pressure wave that has been reflected off the object 101 (or the desired target) back to the source of the pressure wave inducement. The reflected pressure wave or response may be measured by the pressure transducer 104 and recorded at an ultra-high rate (e.g., at least 1 kHz, such as 1-4 kHz or higher) by the system controller 110 for analysis, such as determining pressure profiles of single phase and multi-phase fluids in the conduit 100 and/or determining a location of an object in the conduit 100. Upon manipulating a component (e.g., a valve, pump, and/or vessel) of a hydraulic system, a fluid flow may temporarily be stopped or restricted to induce a pressure wave in the conduit 100, and a pressure in the conduit 100 may be continuously recorded at a point upstream to the component, using the Joukowsky equation, for example:

$$\Delta p_a = \rho u a \quad (1)$$

where $\Delta p_a$ represents a surge pressure; $\rho$ represents a fluid density, u represents a fluid flowing velocity and a represents the speed of sound in the fluid, to estimate the magnitude of the water hammer and using the Darcy-Weisbach equation:

$$\Delta p_f = \left(\frac{f}{2}\right)\left(\frac{\Delta L}{d}\right)\rho u^2 \quad (2)$$

where f is the friction factor, L is a pipe length, d is a pipe diameter, $\rho$ is fluid density and u is fluid velocity, to determine the frictional pressure drop, thereby obtaining a time-log of the pressure change in the conduit. A distance-log of pressure change may be obtained from the time-log and an estimate of the speed of sound in the actual multiphase flow media, using the formula:

$$\Delta L = 0.5 a \Delta t \quad (3)$$

to obtain the relation between time ($\Delta t$) and distance ($\Delta L$). This technique may be useful for detecting, tracking, and/or locating leakages, inflow, deposits, and collapses, various objects and/or blockages, for example. In some examples, a system controller may determine the location of the object in a pipeline or wellbore relative to a location of a measured pressure response or a location of the pressure wave inducement via Equations 1 to 3. For example, the system controller may calculate a distance from a pressure transducer to the object as half the distance a pressure wave travels from the time of the pressure wave inducement to the time the pressure response is measured or received by the pressure transducer. The distance between the pressure transducer and the object may be utilized to calculate a distance to the object relative to a pressure inducement location such as a valve or pump, for example.

The system controller 110 may include a display, a storage unit, and/or any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the system controller 110 may be a computer, a network storage device, or any other suitable device and may vary in size, shape, performance, functionality, and price. The system controller 110 may include a processing unit (e.g., microprocessor, central processing unit, programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The system controller 110 may also include input device(s) (e.g., keyboard, mouse, touchpad, etc.) and output device(s) (e.g., monitor, printer, etc.). The input device(s) and output device(s) provide a user interface. For example, the system controller 110 may enable an operator to select and perform analysis, view collected data, view analysis results, and/or perform other tasks. The system controller 110 may be in communication (e.g., wire or wireless) with various components via communication paths 127. In some examples, the system controller 110 may be operated remotely (e.g., wirelessly) via a device 125 which may include a personal computer, tablet, smartphone, or other digital device. The system controller 110 may be in communication (e.g., wire or wireless) with various components via communication paths 127. In some examples, the system controller 110 may be battery-powered (e.g., rechargeable lithium-ion battery) with up to 10 hours of operation time and may include piezoelectric switches. In other examples, the system controller 110 may be powered by an electric grid and/or a portable generator.

In some examples, observed pressure, calculated distance traveled, pressure variations in the conduit 100, and flow lost through or around the object 101 may be calibrated. After the calibration, a pressure measurement near a pig launcher or the pig receiver 109 may be continuously monitored and used to calculate the object's location in real time.

Figure 1B:
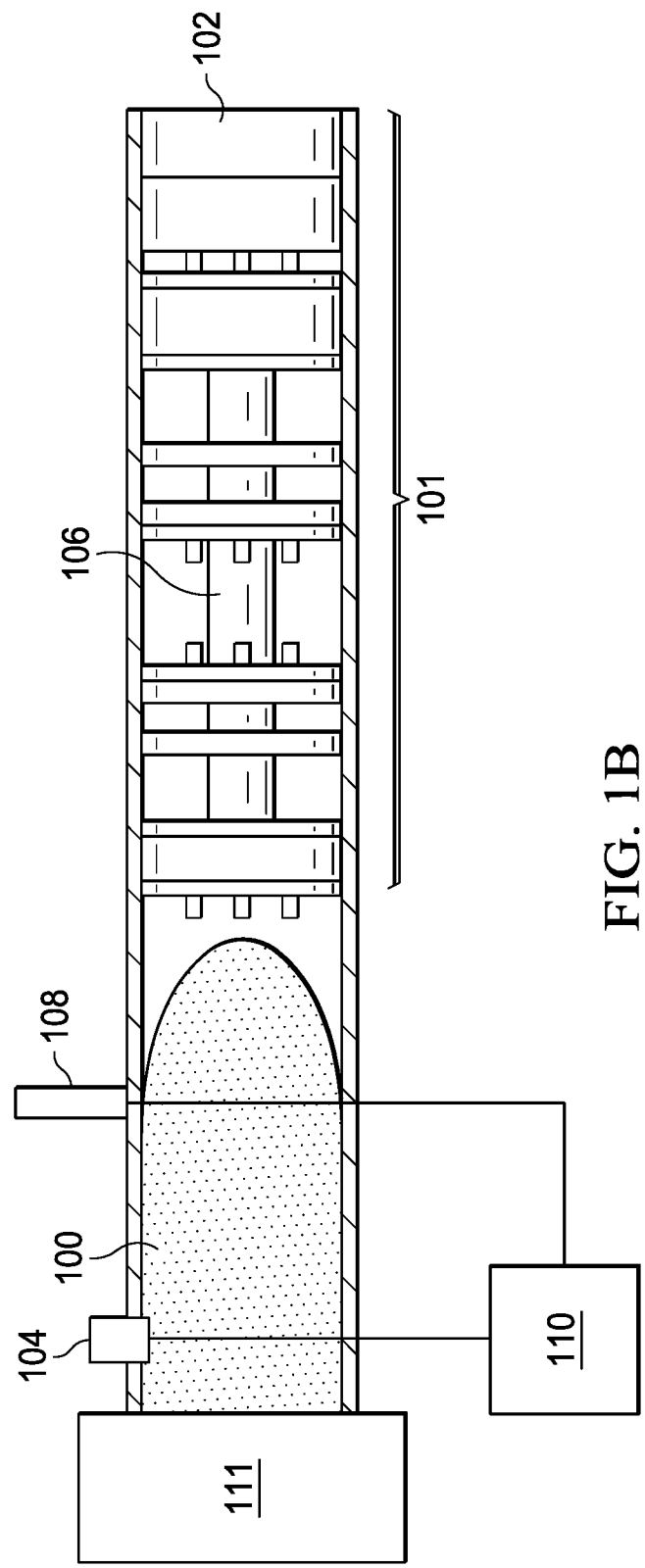
FIG. 1B illustrates a pipeline with an object disposed upstream to the pressure transducer, in accordance with examples of the present disclosure.

FIG. 1B illustrates an alternate configuration of the pressure transducer 104 relative to the object 101 in the conduit 100, in accordance with examples of the present disclosure. The configuration of FIG. 1B may be similar to that of FIG. 1A, however, the pressure transducer 104 and the valve 108 may be disposed upstream to the object 101 such as at a pig launcher 111, rather than downstream at the pig receiver 109, as shown on FIG. 1A, for example. The upstream and downstream configurations of the pressure transducer 104 and/or the valve 108 may facilitate tracking the object 101 from either an upstream direction or a downstream direction. It should be noted that any suitable pig, pig launcher or pig receiver may be utilized.

FIG. 2 illustrates a flow chart for locating and tracking of moving or stationary objects within pipelines and/or wellbores, in accordance with examples of the present disclosure. At step 200, at least two pressure waves may be induced within a conduit (e.g., the conduits 100 and 130 and sections thereof, shown on FIGS. 1A and 1B). As previously described, the pressure waves may be induced within the conduit by controlling flow into or out of the conduit. The pressure waves may have similar or different properties such as frequencies and/or amplitudes, in some examples. The pressure waves may travel along a bore of the conduit to an object (e.g., the objects 101, 124, and 146, shown on FIGS. 1A and 1B) and reflect back to an end of the pipeline where the waves were induced or the source of the pressure wave inducement. The reflected pressure waves may be considered pressure responses in the conduit 100.

At step 202, the pressure responses in the conduit may be measured. In some examples, the pressure waves may be induced before either pressure response is measured. In other examples, a first response may be measured before a second response is measured. The response waves may be measured by a pressure transducer (e.g., the pressure transducer 104 shown on FIGS. 1A and 1B). The pressure transducer may measure the response waves, for example, at an ultra-high sampling rate. The measured pressure response (e.g., response waves) may be measured by a data recorder (e.g., the system controller 110 shown on FIGS. 1A and 1B), which may be a high frequency data recorder in some examples.

At step 204, the preceding steps may be repeated at an interval to provide continuous real-time location updates using Equations 1-3, for example. The analysis of the pressure responses may occur on site or the pressure responses may be transmitted offsite for analysis. A current location may be compared to a previous location to determine a velocity of the object in the conduit. An automated warning system (e.g., the system controller 110 shown on FIGS. 1A and 1B) may send a message (e.g., text, email) to a user when an object velocity fails to satisfy a threshold or is deemed to be too high or too low. In certain examples, a flow rate of fluid in a pipeline may be adjusted by an operating plant to decrease or increase the velocity of the object (e.g., pig), as desired.

The automated warning system may also communicate (e.g., email, text message) to a user when the pig or object velocity is zero, indicating that the object is stuck or stationary. In some examples, the interval may be variable or set. A time period for each interval may include any interval longer than the time required for a wave to travel the entire length of the conduit and return to the data recorder (e.g., the pressure transducer 104). This may be calculated on a case-by-case basis, and kept as short as possible, such as, for example, 1 minute for a 30-kilometer conduit full of water.

Location updates or location information may be transmitted to a web portal to provide a map and live tracking of the object. In some examples, the analysis may be performed on multiple pipelines and resulting data may be cross-referenced to ensure accuracy.

Figure 4:
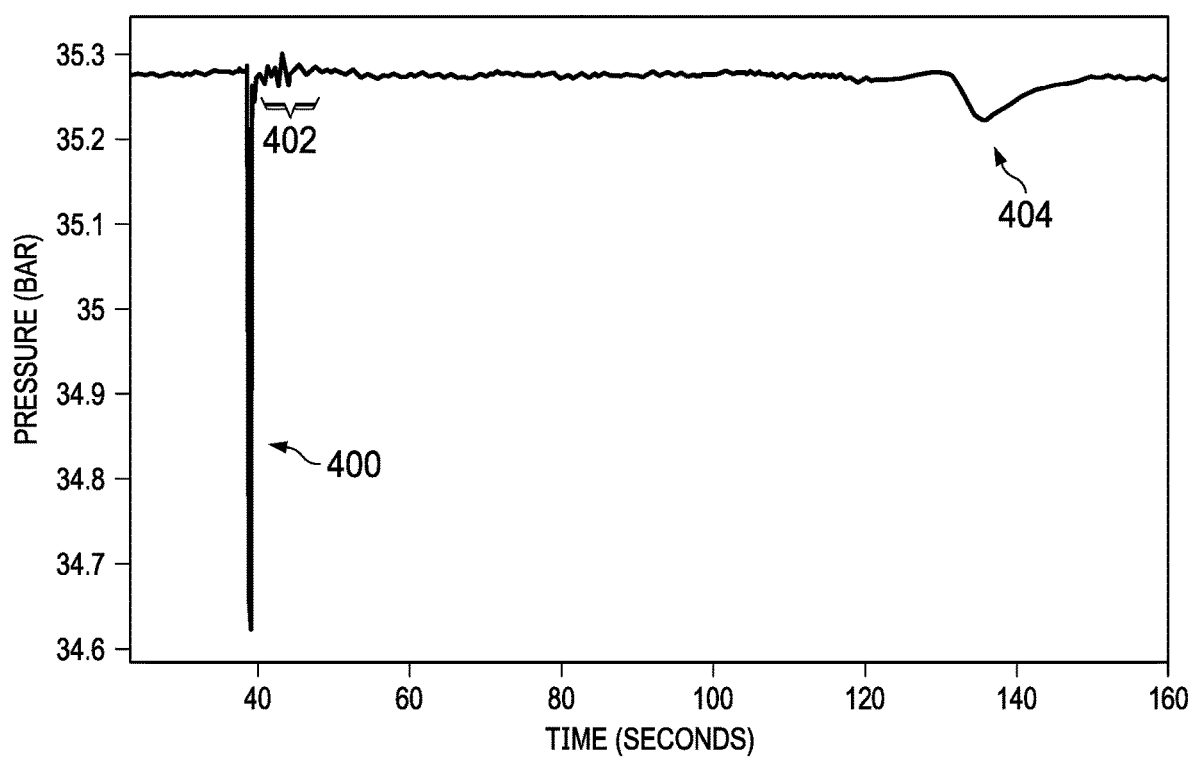
FIG. 4 illustrates a measured pressure response with noise, in accordance with examples of the present disclosure.

FIGS. 3 and 4 illustrate pressure responses during object tracking, in accordance with examples of the present disclosure. As shown on FIG. 3, a pressure wave 300 may be induced to contact the object and elicit a pressure response 302 (e.g., a reflection of the pressure wave 300) and corresponding residual data 304 such as residual pressure waves, for example. The residual data 304 may not be relied upon to track the object. As previously noted, the speed of sound in the fluid and the time from the pressure wave inducement to the first pressure response (e.g., the pressure response 302) may be calculated. Also, a distance from a pressure transducer to the object in a pipeline or wellbore may be calculated via Equations 1 to 3. For example, the distance to the object from the pressure transducer, may be determined as half the distance the pressure wave 300 travels from the time of the pressure wave inducement to the time the pressure response 302 is measured or received by a pressure transducer. The distance between the pressure transducer and the object may be utilized to calculate a distance to the object relative to a pressure inducement location such as a valve or pump, for example. In some examples, as illustrated on FIG. 4, measured pressures may include an induced wave 400, noise 402, and a pressure response 404.

In certain examples, systems and methods of the present disclosure may be applicable to either a temporary installation or a permanent installation. For the permanent installation, the system or method may be triggered by a pig signaler or detector, or by an operator manually initiating the techniques described herein with a button or software interface, for example.

Figure 5:
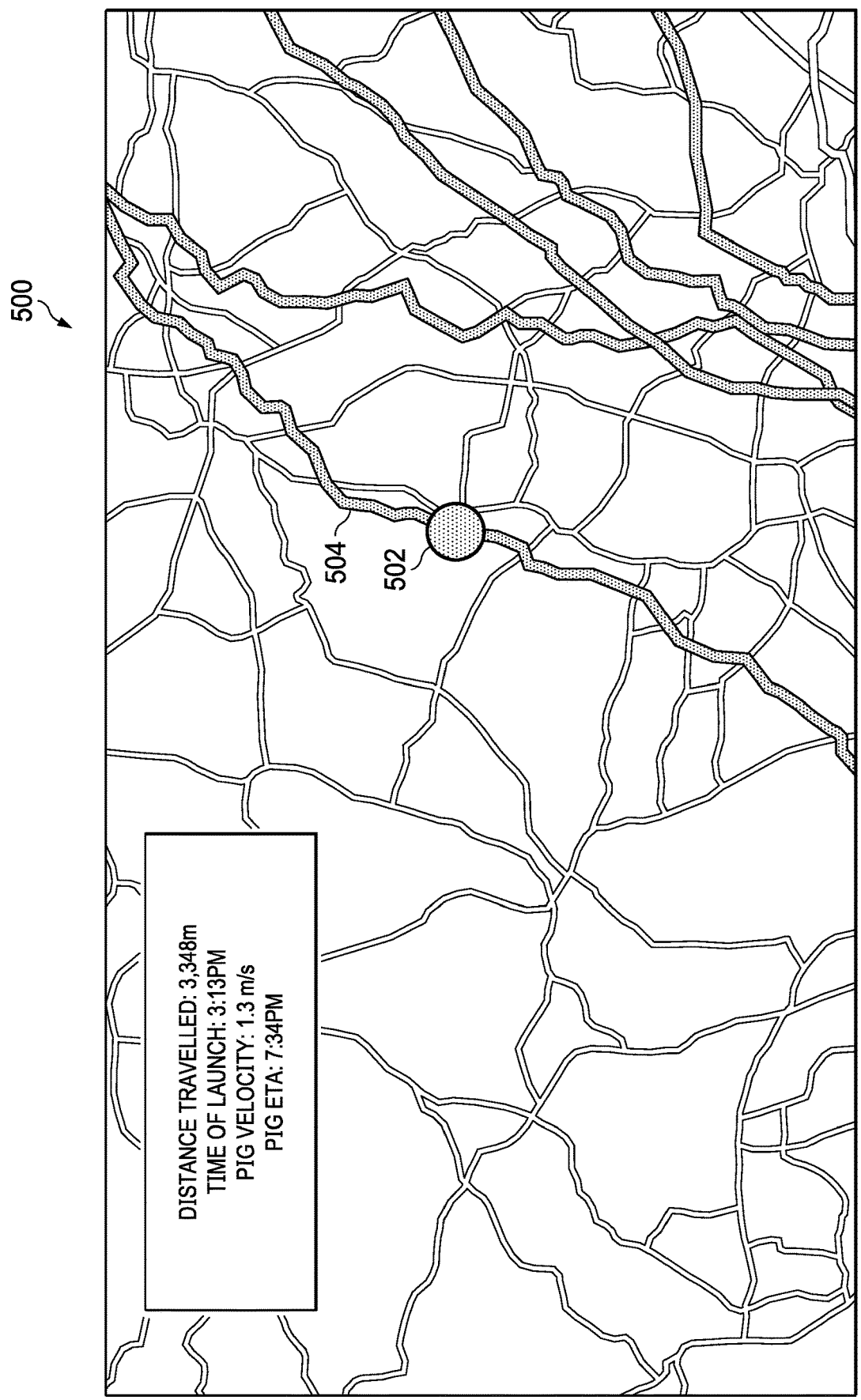
FIG. 5 illustrates a map illustrating tracking of an object, in accordance with examples of the present disclosure.

FIG. 5 illustrates a map 500 illustrating tracking of an object 502 along a pipeline 504, in accordance with examples of the present disclosure. The map 500 may be accessed by a user via a web portal and may be accessible via the system controller 110 (e.g., shown on FIGS. 1A and 1B), for example. Additionally, information such as distance traveled; time of launch; object velocity; and object estimated time of arrival may be displayed and also accessed via the web portal. Onsite requirement for processing data may include a 240-volt or 110-volt power supply; internet connection; and a tie-in point for the pressure transducer into the pipeline at the pig launcher or at the pig receiver.

In certain examples, data that may be required for implementation of the techniques described herein may include pipeline route data for maps and estimated time of arrival (ETA) calculations; gas properties; flow rate; and temperature profile(s).

Accordingly, the systems and methods of the present disclosure may allow for identification of objects in conduits such as pipelines and/or wellbores. Additionally, the systems and methods may provide real-time location data for the object; object speed in a conduit; estimated arrival times; and automated warning of the object speed. The systems and methods may include any of the various features disclosed herein, including one or more of the following statements.

Statement 1. A system for non-intrusively tracking an object in a conduit, the system comprising: a component positioned to control flow into or out of a conduit to induce pressure waves in the conduit; a pressure transducer in fluid communication with the conduit, the pressure transducer positioned to measure pressure responses in the conduit due to contact of pressure waves with the object that is in the conduit; and a system controller operable to: receive pressure data from the pressure transducer, wherein the pressure data includes pressure responses to the pressure waves; and determine a distance of the object in the conduit, relative to the component or the pressure transducer, based on the pressure responses.

Statement 2. The system of the statement 1, wherein the pressure transducer is located at a pig launcher that is in fluid communication with the conduit.

Statement 3. The system of the statement 1 or the statement 2, wherein the pressure transducer is located at a pig receiver that is in fluid communication with the conduit.

Statement 4. The system of any one of the preceding statements, wherein a sampling rate of the pressure transducer is 1 kilohertz or higher.

Statement 5. The system of any one of the preceding statements, wherein the component comprises a valve.

Statement 6. The system of any one of the preceding statements, wherein the component comprises a pump.

Statement 7. A method for non-intrusively tracking a pig in a pipeline, the method comprising: controlling a flow into or out of the pipeline to induce pressure waves in the pipeline; measuring, with a pressure transducer, pressure responses in the pipeline due to contact of the pressure waves with the pig; and determining a distance of the pig relative to a location of the pressure transducer or a location of pressure wave inducement, based on the pressure responses.

Statement 8. The method of the statement 7, further comprising measuring pressure responses induced by a reciprocating pump that removes fluid from the pipeline to induce at least two negative pressure waves in the pipeline.

Statement 9. The method of the statement 7 or the statement 8, further comprising inducing at least two negative pressure waves in the pipeline via a release of fluid from the pipeline or inducing at least two positive pressure waves in the pipeline via an addition of fluid into the pipeline.

Statement 10. The method of any one of the statements 7-9, further comprising inducing at least two positive pressure waves in the pipeline via an addition of fluid into the pipeline.

Statement 11. The method of any one of the statements 7-10, further comprising providing continuous real-time location updates of the pig in the pipeline.

Statement 12. The method of any one of the statements 7-11, further comprising allowing access to a map that provides a location of the pig in real-time.

Statement 13. The method of any one of the statements 7-12, further comprising determining at least a velocity, a distance traveled, a time of launch, pig velocity, or an estimated time of arrival for the pig.

Statement 14. The method of any one of the statements 7-13, further comprising communicating a warning based on a velocity of the pig in the pipeline.

Statement 15. The method of any one of the statements 7-14, further comprising recording pressure data at a frequency ranging from 1 kilohertz (kHz) to 4 kHz.

Statement 16. A method for non-intrusively tracking an object in a conduit, the method comprising: controlling a flow into or out of the conduit to induce pressure waves in the conduit; measuring pressure responses in the conduit due to contact of the pressure waves with the object; and determining a distance of the object relative to a wave inducement location, based on the pressure responses.

Statement 17. The method of the statement 16, further comprising determining at least a velocity, a distance traveled, a time of launch, object velocity, or an estimated time of arrival for the object in real time.

Statement 18. The method of the statement 16 or 17, further comprising sampling the pressure data at a rate ranging from 1 kHz or higher.

Statement 19. The method of any one of the statements 16-18, further comprising indicating a location of the object in real-time with a map.

Statement 20. The method of any one of the statements 16-19, further comprising communicating a warning based on a velocity of the object.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for non-intrusively tracking a pipeline pig in a pipeline, the system comprising:
   a component positioned to control flow into or out of the pipeline configured to induce a first pressure wave and a second pressure wave in the pipeline, wherein the first pressure wave and the second pressure wave have different frequencies, amplitudes, or both;
   a pressure transducer in fluid communication with the pipeline, the pressure transducer positioned to measure a first pressure wave response and a second pressure wave response in the pipeline due to contact of the first pressure wave and the second pressure wave with the pipeline pig that is in the pipeline; and
   a system controller operable to:
      receive pressure data from the pressure transducer, wherein the pressure data includes the first pressure wave response and the second pressure wave response; and
      determine a distance of the pipeline pig in the pipeline, relative to the component or the pressure transducer, based on the first pressure wave response and the second pressure wave response.

2. The system of claim 1, wherein the pressure transducer is located at a pig launcher that is in fluid communication with the pipeline.

3. The system of claim 1, wherein the pressure transducer is located at a pig receiver that is in fluid communication with the pipeline.

4. The system of claim 1, wherein a sampling rate of the pressure transducer is 1 kilohertz or higher.

5. The system of claim 1, wherein the component comprises a valve.

6. A method for non-intrusively tracking a pipeline pig in a pipeline, the method comprising:
   controlling a flow into or out of the pipeline to induce a first pressure wave and thereafter a second pressure wave in the pipeline, wherein the first pressure wave and the second pressure wave have different frequencies, amplitudes, or both;
   measuring, with a pressure transducer, a first pressure response corresponding to the first pressure wave and thereafter a second pressure response corresponding to the second pressure wave in the pipeline due to contact of the first pressure wave and the second pressure wave with the pipeline pig, wherein the pressure transducer is in fluid communication with a fluid in the pipeline; and
   determining a distance of the pipeline pig in the pipeline relative to a location of the pressure transducer or a location of pressure wave inducement, based on the first pressure response and the second pressure response.

7. The method of claim 6, further comprising measuring pressure responses induced by a reciprocating pump that removes fluid from the pipeline to induce at least two negative pressure waves in the pipeline.

8. The method of claim 6, further comprising inducing at least two negative pressure waves in the pipeline via a release of fluid from the pipeline.

9. The method of claim 6, further comprising inducing at least two positive pressure waves in the pipeline via an addition of fluid into the pipeline.

10. The method of claim 6, further comprising providing continuous real-time location updates of the pipeline pig in the pipeline.

11. The method of claim 10, further comprising allowing access to a pipeline map that provides a location of the pipeline pig in real-time, and wherein the pipeline map is continuously updating with the location of the pipeline pig within the pipeline.

12. The method of claim 11, further comprising determining at least a velocity, a distance traveled, a time of launch, pig velocity, or an estimated time of arrival for the pipeline pig.

13. The method of claim 6, further comprising communicating a warning based on a velocity of the pipeline pig in the pipeline.

14. The method of claim 6, further comprising recording pressure data at a frequency ranging from 1 kilohertz (kHz) to 4 kHz.

15. A method for non-intrusively tracking a pipeline pig in a pipeline, the method comprising:
   controlling a flow into or out of the pipeline to induce a first pressure wave and thereafter a second pressure wave in the pipeline, wherein the first pressure wave and the second pressure wave have different frequencies, amplitudes or both;
   measuring a first pressure response corresponding to the first pressure wave and thereafter a second pressure response corresponding to the second pressure wave in the pipeline due to contact of the first pressure wave and the second pressure wave with the pipeline pig using a pressure transducer in fluid communication with a fluid in the pipeline;
   determining a distance and velocity of the pipeline pig relative to a wave inducement location based on the first pressure response and the second pressure response; and
   adjusting a flow rate of fluid in the pipeline wherein the adjusting comprises either increasing the velocity of the pipeline pig above a threshold or decreasing the velocity of the below a threshold.

16. The method of claim 15, further comprising determining at least a distance traveled, a time of launch, object velocity, or an estimated time of arrival for the pipeline pig in real time.

17. The method of claim 15, further comprising sampling pressure data at a rate of 1 kilohertz or higher.

18. The method of claim 15, further comprising indicating a location of the pipeline pig in real-time with a map.

19. The method of claim 15, further comprising communicating a warning based on a velocity of the pipeline pig.

* * * * *